Sept. 13, 1960    J. VISSER    2,952,426
WHEEL FORCE STEERING APPARATUS
Filed Sept. 27, 1957    2 Sheets-Sheet 2
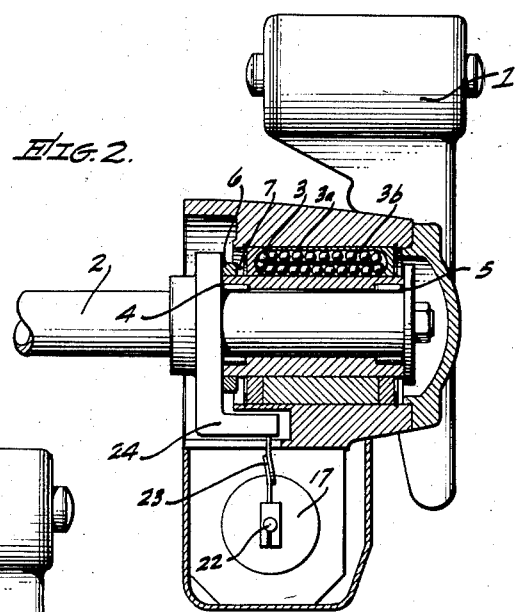
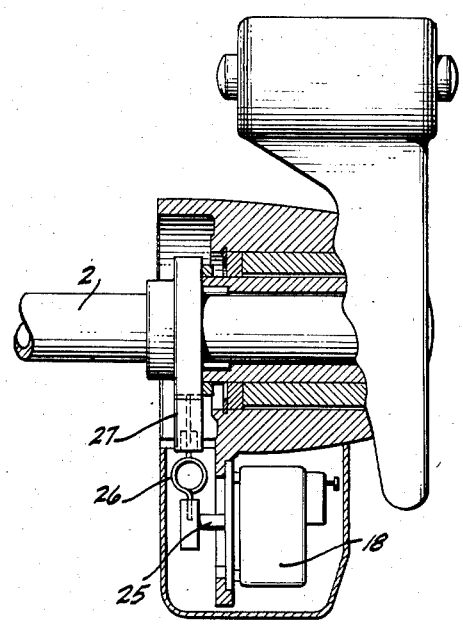
INVENTOR.
JACOB VISSER,
BY Harold J. Downes
ATTORNEY United States Patent Office 2,952,426
Patented Sept. 13, 1960

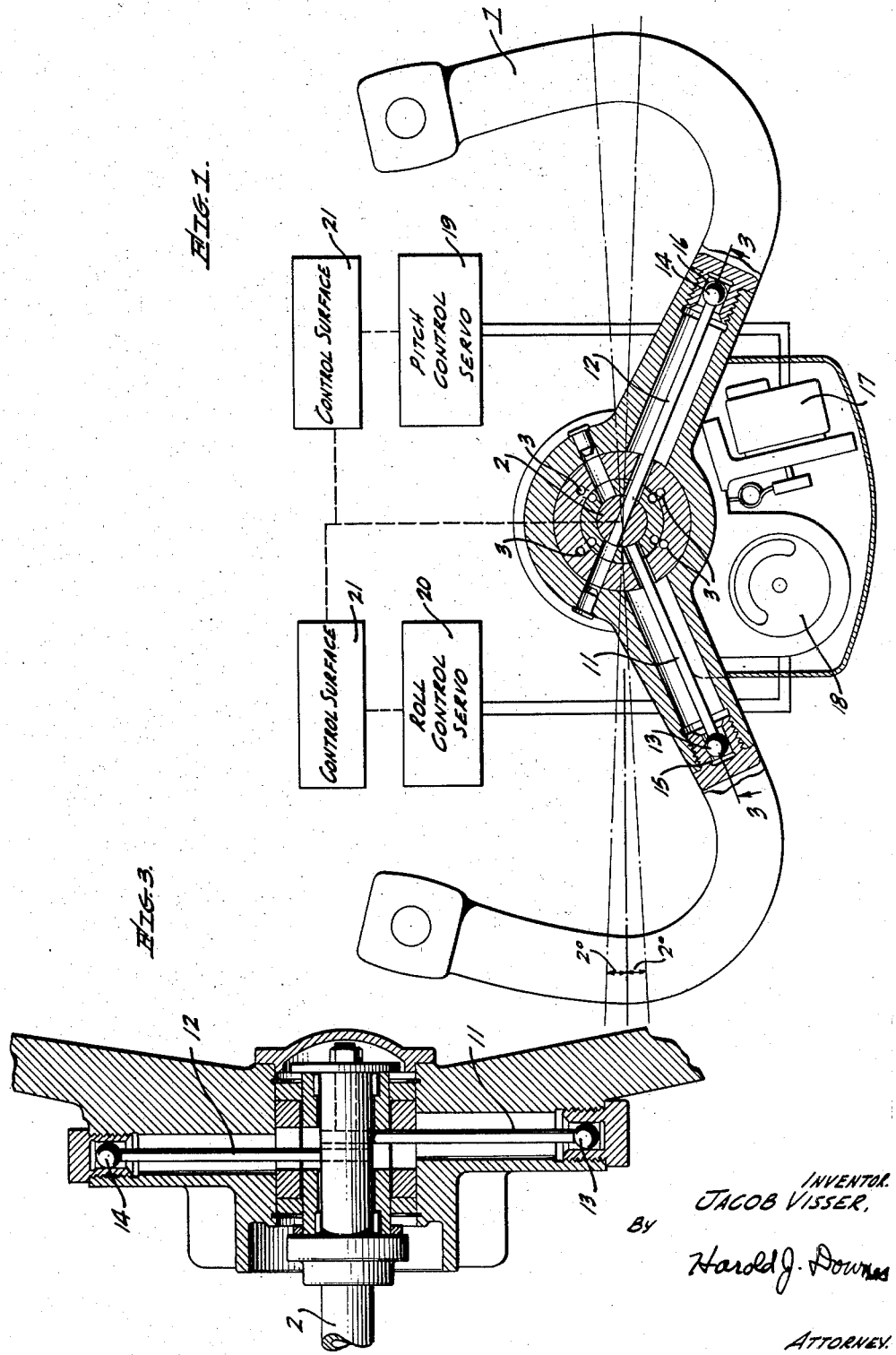

2,952,426

WHEEL FORCE STEERING APPARATUS

Jacob Visser, Grand Rapids, Mich., assignor to Lear, Incorporated

Filed Sept. 27, 1957, Ser. No. 686,625

2 Claims. (Cl. 244—83)

This invention relates to systems for reducing the effort required of the pilot to control the flight of an aircraft and, in particular, to a device for providing boost forces to the control surfaces in response to slight movements of the control wheel of an aircraft.

When an aircraft is under manual control, the effort required to "drive" the aircraft through the use of the control wheel is sufficient to cause substantial fatigue in a relatively short period of time. In military aircraft and in the larger commercial aircraft, this effort becomes considerable because of the size of the forces required to change the pitch and roll attitudes of the aircraft. One of the problems associated with providing a satisfactory boost for the control system in roll and pitch is that of hysteresis. If the aircraft control system is displaced by a movement of the wheel and then returned to its original position, the control surfaces and the attitude of the aircraft ought to return exactly to their former positions. Systems proposed in the past for this function, however, have been noted to incorporate objectionable hysteresis, with the result that the aircraft control system has an undesirable dead zone near its neutral position and a certain objectionable amount of "slop" between the motion of the wheel and the motion of the aircraft has been noted. While a certain minimum amount of this objectionable symptom can be tolerated in an automobile, under certain conditions of the flight of an aircraft, undesirable oscillations can occur.

A second problem is that as aircraft speeds increase, the momentary distraction suffered by the pilot in switching from an automatic control system such as has heretofore been actuated by the pilot independently of the conventional wheel or stick and rudder controls, becomes more and more intolerable. To illustrate, a conventional autopilot is ordinarily controlled by the pilot through a series of knobs and switches on or near the instrument panel of the aircraft. If the autopilot malfunctions for any reason, the pilot of course wishes to assume manual control of the aircraft by actuation of the wheel or stick and rudder. Ordinarily, in the past this has necessitated the actuation of various switches, knobs and controls on the instrument panel, after which the pilot is permitted to take control of the aircraft manually. The faster the aircraft is traveling, however, the more critical is the time necessary to perform these few additional switching operations. It would therefore be highly desirable if the control of the aircraft were at all times effected through the agency of a single set of controls and if the pilot merely were required to exert an additional effort of the same type as that employed in controlling the aircraft automatically to control it manually.

A third problem in aircraft control boost systems has been that unless the wheel resists the force of the pilot in proportion to the magnitude of the steering force, the pilot loses some sense of the severity of the maneuver he is commanding of the aircraft. Thus, the control system ought to resist the application of control force in proportion to the magnitude of the force if the pilot is to be provided with a "feel" that he has the aircraft tightly under his control.

In this invention, a wheel in outward aspects identical to a manual aircraft steering wheel is provided with an internal springing system of limited deflection, in accordance with Hooke's law, in the axial direction of the steering column and in the direction of rotation of the wheel so that the greater the force applied by the pilot, the greater the resistance to that force becomes. In addition, pickoffs for the slight deformations suffered by the springing system are provided. These pickoffs produce signals which are linearly related to the deflection of the springing system, and since the deflection of the springing system is related linearly to the applied force in accordance with Hooke's law, the command signal emanating from the pickoffs and controlling the control servo system are strictly proportional to the forces applied to the wheel.

It is therefore an object of this invention to provide an improved aircraft boost steering system for yaw and pitch.

It is another object of this invention to provide an aircraft steering system involving a minimum of hysteresis.

It is another object of this invention to provide a yaw and pitch steering system in which the response of the control system is linearly related to the forces applied by the pilot.

It is another object of this invention to provide a boosted aircraft control system incorporating a wheel sensor and wheel assembly adapted to replace a conventional aircraft control wheel.

Other objects of invention will become apparent from the following description taken in connection with the accompanying drawings, in which—

Fig. 1 is a plan view, partly in section, of the steering system of this invention;

Fig. 2 is an elevational view, partly in section, of the device shown in Fig. 1;

Fig. 3 is a sectional view, taken at 3—3 in Fig. 1; and

Fig. 4 is a sectional view showing the operation of the roll signal pickoff of this invention.

Referring to Figs. 1 and 2, a control wheel 1 is slideably and rotatably supported on a steering shaft or column 2 by means of longitudinal bearing 3 and rotary bearings 4 and 5. Without the apparatus herein described, motion of the steering shaft in rotation causes roll displacement of the aircraft, and longitudinal motion of the shaft causes pitching displacement of the craft by means of conventional mechanical, hydraulic or electrical linkages in a manner well known in the aircraft control art. However, in contradistinction to the prior art, in this invention the control wheel is not solidly fixed to the steering column or shaft; but a certain elastically restrained, limited motion both rotary and longitudinal exists between the wheel and shaft. Likewise, the rotary motion of the wheel with respect to the shaft is limited by contact between pickoff bracket 8 and the edges of cutout 9 in ring 10 attached to the wheel.

The wheel is supported on shaft 2 by means of cantilever spring rods 11 and 12 which are supported at their outer ends by means of balls 13 and 14 in cylindrical sockets 15 and 16, respectively. The other ends of rods 11 and 12 are fastened securely to shaft 2. It should be noted that the openings provided in the spokes of the wheel are sufficient to permit limited longitudinal and rotary motion of the wheel with respect to the shaft, which motion, however, is resisted by bending of rods 11 and 12. This longitudinal and rotary motion is detected by pickoffs 17 and 18, respectively, which have an output in electrical form. The signals from pickoffs 17 and 18 are fed to the aircraft pitch control servo 19 and aircraft roll control servo 20, respectively, which in turn control the operation of the aircraft's control surfaces 21 and 22 in the conventional manner, as indicated in Fig. 1. Of course, the control surfaces are directly mechanically linked to the steering shaft by conventional means indicated by dotted lines 21a in Fig. 1.

In a conventional unboosted aircraft control system, longitudinal motion of the wheel, i.e., motion of the wheel parallel to the steering column, results in pitching motion of the aircraft, either up or down, depending upon the direction of application of the force. Likewise, turning the wheel causes the airplane to roll. In this invention, applying a longitudinal force to the wheel causes bending of rods 11 and 12 which are anchored to shaft 2 on the one hand and supported in sockets 14 and 15 secured in the wheel spokes. If rods 11 and 12 are made of steel or beryllium copper, or a number of other materials which obey Hooke's law for small deflections, the magnitude of the deflection produced is proportional to the magnitude of the force applied. Since pickoffs 17 and 18 are attached to the wheel, as shown, but since, as shown in Fig. 2, shaft 22 of pickoff 17 is attached by means of wire 23 to bracket 24 attached to shaft 2, longitudinal motion of the wheel produces the motion of pickoff in proportion to the motion of the wheel. The electrical output of the pickoff, therefore, is proportional to the longitudinal motion of the wheel, and this electrical signal is fed to the aircraft pitch control servo 19 where it is amplified and used to actuate control surface 21 which controls the pitch attitude of the aircraft.

Likewise, in roll, pickoff 18 is attached to the wheel, but its shaft 25 is caused to rotate by means of wire 26 which is in turn attached to bracket 27 secured to wheel 2. Therefore, when the wheel is rotated, pickoff 18 provides an electrical signal in proportion to the magnitude of the rotation of the wheel, and since the magnitude of this rotation is in turn within the limits by which rods 11 and 12 obey Hooke's law proportional to the force applied to turn the wheel, the signal output of pickoff 18 is proportional to the torque applied to the wheel by the pilot. This electrical signal is fed to the aircraft roll control servo 20 where it is amplified and used to control the actuation of control surfaces 21 which control the roll attitude of the aircraft.

If the pilot for any reason finds it necessary to override the electrical control of the aircraft afforded by the system above-disclosed, it is necessary only that he overcome the resistance of springs 11 and 12 either longitudinally or rotationally until the rotational and longitudinal motion of the wheel exceeds the limits established by the stops. At this point the wheel is directly connected to the steering shaft or column, and the mechanical electromechanical, hydraulic or other linkage between the steering column and the control surfaces is effective to control the aircraft directly.

Although the invention has been described and illustrated in detail, it is clearly understood that the same is by way of illustration and example only and is not to be taken by way of limitation, the spirit and scope of this invention being limited only by the terms of the appended claims.

I claim:

1. A wheel force sensor comprising a hub, a steering shaft attached to said hub, a wheel having at least two hollow spokes, and cantilever springs attached to the near outboard end of said spokes and to said hub, said cantilever being sufficiently smaller than the inside dimension of said spokes to provide at least limited rotary and axial motion of said wheel with respect to said hub and means for generating separate electrical signals in response to said motions.

2. A device as recited in claim 1 and further comprising an aircraft pitch and roll control system mechanically responsive to motion of said hub and a servo system responsive to said separate electrical signals.

References Cited in the file of this patent

UNITED STATES PATENTS 2,408,770    Fresche et al. _____ Oct. 8, 1946